Patented Apr. 4, 1950

2,502,411

UNITED STATES PATENT OFFICE 2,502,411

ZIRCONYL ACRYLATES

Harry T. Neher, Bristol, William R. Conn, Melrose Park, and Edwin H. Kroeker, Cheltenham, Pa., assignors to Röhm & Haas Company, Philadelphia, Pa., a corporation of Delaware No Drawing. Application August 18, 1947, Serial No. 769,324

3 Claims. (Cl. 260—86.1)

This invention relates to compounds of acrylic and α-substituted acrylic acids and zirconium. In particular, this invention concerns zirconyl acrylate, zirconyl methacrylate, and other zirconyl α-substituted.

The zirconium compounds of this invention are polymerizable by themselves. They have excellent solubility in a wide variety of organic liquids. When dissolved in other polymerizable unsaturated organic compounds, such as methyl acrylate, ethyl acrylate, butyl acrylate, methyl methacrylate, ethyl methacrylate, isobutyl methacrylate, vinyl acetate, vinyl propionate, styrene, and the like, they may be copolymerized therewith. These compounds form a class identified by the term "vinylidene compounds" and are characterized by the presence of a terminal pair of olefinically bonded carbon atoms, $CH_2=C=$. The copolymers thus obtained are particularly resistant to solvents and have elevated softening points.

The zirconium compounds of this invention have unique and distinctive properties in promoting wetting of ceramics, metals, and cellulose. Thus, the polymers prepared therefrom provide good adhesion to surfaces of such materials. This property in conjunction with others, such as hardness and high softening point, makes them valuable for bonding abrasives, such as silicon carbide, crystalline alumina, and the like. The wetting of cellulose permits the use of cellulose fibers in molding powders of the ethenoid polymers. Another use for the zirconium compounds of this invention is in conjunction with the laminating of sheets of acrylic resins with intermediate layers of polyvinyl acetals, promoting adhesion of intermediate layer to resin sheet.

The zirconium compounds of this invention are conveniently prepared by metathesis between a salt of an acrylic acid and a water-soluble zirconyl salt, such as zirconyl chloride, zirconyl sulfate, or zirconyl nitrate, or soluble double salts such as zirconyl sulfate-sodium sulfate or zirconyl sulfate-potassium sulfate.

As an acrylic salt, there may be used sodium acrylate, potassium acrylate, sodium ethacrylate, sodium chloroacrylate, and the like.

The acrylic salt is dissolved or suspended in a liquid medium along with the zirconyl salt. The mixture is then stirred. Heating accelerates the interchange. The products are separated and, if desired, the zirconyl compound purified by extraction, charcoaling, or other treatment.

As a solvent, there may be used water, in which case the zirconium acrylic compound precipitates. Alternatively, there may be used a non-polar solvent, such as benzene, toluene, cumene, or petrolum products which are prepared for use as special solvents and may be classed as naphthas, in which case the inorganic salt formed by metathesis precipitates.

The monomeric materials thus obtained are capable of polymerization with peroxide catalysts such as benzoyl peroxide, tert.-butyl hydroperoxide, or lauroyl peroxide. The monomeric zirconyl compound or a mixture of such compound and another polymerizable unsaturated organic compound may be mixed with catalyst and converted to polymeric material. Such polymerization is usually accomplished by heating in a mold for shaping the final product. Only copolymers having less than about 2% of a zirconyl acrylate appear to be capable of being shaped subsequent to polymerization as by compression.

The invention is illustrated by the following examples:

Example 1

To a suspension of 352 grams of sodium methacrylate and 225 grams of anhydrous sodium sulfate in about 2200 grams of benzene, there was added 480 grams of zirconium oxychloride octahydrate. The resulting mixture was stirred for an hour while the temperature was held at 50° C. The flaky crystals of sodium methacrylate disappeared and were replaced by fine crystals of sodium chloride. The solid materials, consisting of sodium chloride and sodium sulfate, were separated upon filtration and the resulting clear filtrate concentrated by evaporation of solvent under reduced pressure. A semi-solid residue was thus obtained. It was taken up in about 317 grams of methyl alcohol (anhydrous) and treated with activated charcoal. The solution was then filtered, to give a clear, colorless filtrate, which was concentrated by evaporation under reduced pressure to a syrup. This syrup was stored in a vacuum desiccator over phosphorus pentaoxide for twenty-four hours. The product thus obtained amounted to 344 grams and was a practically colorless, brittle solid, containing by analysis 97% zirconyl methacrylate. It was completely soluble in methyl methacrylate, methyl acrylate, ethyl acrylate, or mixtures of such esters, in vinyl esters, such as vinyl acetate, in styrene and in solvents such as ethylene dichloride, ethyl acetate, and acetone. The zirconyl methacrylate polymerized when mixed with benzoyl peroxide and subjected to heat. The solutions in ethenoids were also found readily polymerizable. The monomer in an organic solvent may be applied to surfaces and polymerized thereon.

Example 2

A solution of 13 grams of potassium methacrylate in 50 milliliters of water was added to a solution of 20 grams of the double salt of zirconyl sulfate and sodium sulfate in 200 milliliters of water. A precipitate formed, was separated by filtration, and then dried in air at about 70° C. The dried product was extracted with benzene. The resulting benzene solution was concentrated under reduced pressure. The residue consisted of seven grams of zirconyl methacrylate.

Example 3

A solution of 78 grams of sodium acrylate was made in about 350 grams of water and mixed with a solution of 322 grams of hydrated zirconyl chloride in several liters of water. The precipitate which formed was filtered off, dried, and taken up in ethylene dichloride and toluene. This solution was treated with charcoal and filtered. This solution may be used for applying the zirconyl acrylate to cellulose floc which could then be incorporated in molding powder from an acrylic ester.

Example 4

A solution was prepared from 15 parts of zirconyl methacrylate and 85 parts of methyl methacrylate. This was treated with 0.1 part of benzoyl peroxide and one part of stearic acid and poured into a mold for making sheets. The mold and contents were held at 60° C. for about fifteen hours. Thereupon, the mold was removed and a clear, colorless sheet obtained. This sheet was insoluble in the usual organic solvents which dissolve polymethyl methacrylate. It had a softening temperature 35° C. above that of methyl methacrylate polymer. The cast sheet could be further shaped when heated, although it could not be drawn.

Example 5

A mixture was made from 20 parts of zirconyl methacrylate and 80 parts of butyl methacrylate, and a trace of catalyst and a small amount of parting agent were added thereto. The mixture was then poured into a mold and heated slowly to about 75° C. over the course of about sixteen hours. The resulting cast sheet was insoluble in common organic solvents. It had a softening temperature about 90° C. above that of pure polybutyl methacrylate.

Example 6

A mixture of eight parts of zirconyl methacrylate and 92 parts of ethyl acrylate gave a polymer softening 20° C. above pure polyethyl methacrylate. The copolymer showed improved toughness and hardness over polyethyl acrylate.

Example 7

(a) A mixture of three parts of zirconyl methacrylate and 97 parts of methyl methacrylate was polymerized as in the above examples. The product obtained softened at a temperature 3° C. above the point at which a polymer of methyl methacrylate prepared under the same conditions would soften. The change in solubility was, however, most marked, as the cast objects were insoluble in all ordinary organic solvents. There was a definite increase in hardness over pure polymethyl methacrylate.

(b) A copolymer from one part of zirconyl methacrylate and 99 parts of methyl acrylate showed no definite increase in softening point but was, nevertheless, not soluble in organic solvents, exhibiting only some swelling therein. Sheets of this copolymer could be heated and changed in shape. The above examples illustrate the remarkable effect on properties of polymer resulting from the presence of even a small amount of the zirconyl compounds.

Example 8

A mixture of 10 parts of zirconyl methacrylate and 90 parts of styrene gave a clear, colorless polymer which softened 15° C. above pure polystyrene and was insoluble in the usual organic solvents.

Example 9

(a) Mixtures of 25 parts of zirconyl acrylate and 75 parts of methyl methacrylate were polymerized with 0.2 part of benzoyl peroxide. The products obtained were clear and generally colorless. They neither dissolved nor swelled in organic solvents.

(b) Mixtures of 25 parts of zirconyl methacrylate and 75 parts of ethyl methacrylate gave polymers which were clear, practically colorless, insoluble in organic solvents, and surprisingly tough.

Example 10

A mixture of ten parts of zirconyl methacrylate and 90 parts of ethyl acrylate was polymerized with benzoyl peroxide and heat. The resulting copolymer was clear, colorless, and insoluble in organic solvents. It was distinctly harder than polyethyl acrylate and had a higher softening temperature.

Instead of the particular acrylic esters shown above by way of illustration, there may be used other polymerizable unsaturated compounds with which the zirconyl acrylates are miscible or in which the zirconyl acrylates are soluble. Mixtures of polymerizable unsaturated compounds may be used. Thus, mixtures of ethyl acrylate and acrylonitrile or methacrylonitrile may serve as the base materials for yielding useful polymers. The addition thereto of a zirconyl acrylate provides increased hardness to the polymer and insolubility in the usual organic solvents.

The influence of the zirconyl acrylates is shown at a concentration even as low as one half per cent. in respect to some properties, particularly solubility, although at least one per cent. is usually a preferred minimum concentration. Higher concentrations give more marked effects in the copolymers formed therewith. A copolymer formed with 25% of a zirconyl acrylate and 75% of a polymerizable unsaturated organic compound utilizes the full benefits of the zirconyl salts. Yet higher proportions of the zirconyl salts may be used, interpolymers with valuable properties being obtained with 50% of each. There is no fixed upper limit for the concentration of the zirconyl acrylates, however, except insofar as solubility limits the formation of true solutions used for copolymerization, mixed polymers being possible beyond that limit.

The zirconyl acrylates give cross-linked polymers and, as is evident, provide cross-linking in interpolymers or copolymers in which they are used. The effect of the zirconyl acrylates is, therefore, most marked when they are used to form copolymers with unsaturated compounds yielding chain polymers by themselves. The preferred unsaturated compounds for forming copolymers with the zirconyl acrylates are those which by themselves yield thermoplastic polymers, whether esters of acrylic acid, methacrylic acid, or other α-substituted acrylic acid or a vinyl compound, including vinyl esters and ethers, such as vinyl methyl ether and vinyl isobutyl ether, vinyl carbazole, vinyl chloride, vinyl chloride—vinyl acetate, and styrene.

In some cases, the zirconyl acrylates can be used with other cross-linking unsaturates, such as diallyl phthalate, diethylene glycol bis(allyl carbonate), glycol dimethacrylate, and the like. In these applications, the zirconyl compounds may add hardness, improve resistance against solvents, and change the wetting characteristics toward solids, including metals and cellulose. The zirconyl acrylates may also be used with already formed resins or polymers, including the vinyl acetals, such as vinyl formal or vinyl butyral. The zirconyl acrylates are thus valuable compounds for use by themselves or in conjunction with a wide range of other polymerizable compounds.

We claim:

1. A copolymer of 0.5 to 50 parts of zirconyl methacrylate and 99.5 to 50 parts of an ester of methacrylic acid and a saturated monohydric aliphatic alcohol of one to four carbon atoms.

2. A copolymer of 0.5 to 50 parts of zirconyl methacrylate and 99.5 to 50 parts of methyl methacrylate.

3. A copolymer of 0.5 to 50 parts of zirconyl methacrylate and 99.5 to 50 parts of butyl methacrylate.

HARRY T. NEHER.
WILLIAM R. CONN.
EDWIN H. KROEKER.

REFERENCES CITED

The following references are of record in the file of this patent:

UNITED STATES PATENTS

| Number | Name | Date |
|---|---|---|
| 2,253,128 | Langkammerer | Aug. 19, 1941 |

OTHER REFERENCES

Tanatar et al., J. Russ. Phys. Chem. Soc., 39, 936–947, abstracted in Chem. Abstracts, 2, 1129 (1908)

Lange, Handbook of Chemistry, 5th ed., pages 54–55, published by Handbook Publishers, Inc., (1944).